(12) United States Patent
Hiraishi et al.

(10) Patent No.: US 11,007,696 B2
(45) Date of Patent: May 18, 2021

(54) METHOD AND APPARATUS FOR DECORATIVE MOLDING

(71) Applicant: Panasonic Intellectual Property Management Co., Ltd., Osaka (JP)

(72) Inventors: Masakazu Hiraishi, Kyoto (JP); Takashi Morimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 172 days.

(21) Appl. No.: 16/255,652

(22) Filed: Jan. 23, 2019

(65) Prior Publication Data

US 2019/0232541 A1    Aug. 1, 2019

(30) Foreign Application Priority Data

Feb. 1, 2018    (JP) .............................. JP2018-016049

(51) Int. Cl.
*B29C 45/80* (2006.01)
*B29C 45/37* (2006.01)
(Continued)

(52) U.S. Cl.
CPC ............ *B29C 45/80* (2013.01); *B29C 33/126* (2013.01); *B29C 33/14* (2013.01);
(Continued)

(58) Field of Classification Search
CPC ........................................... B29C 2045/14172
See application file for complete search history.

(56) References Cited

U.S. PATENT DOCUMENTS

2012/0293974 A1    11/2012 Asano et al.

FOREIGN PATENT DOCUMENTS

CN    102789747    11/2012
JP    3-023915    1/1991
(Continued)

OTHER PUBLICATIONS

Translation of JP 3-23915 (Year: 1991).*
English Translation of Search Report dated Nov. 27, 2020 in corresponding Chinese Patent Application No. 201910072642.5.

*Primary Examiner* — Marc C Howell
*Assistant Examiner* — John J Derusso
(74) *Attorney, Agent, or Firm* — Wenderoth, Lind & Ponack, L.L.P.

(57) ABSTRACT

A method for decorative molding capable of reducing a preparation time at the time of replacing a mold and expecting improvement in positioning accuracy of a decorative pattern in a molded article includes supplying a film on which a decorative pattern is formed between a first mold and a second mold in a mold open state of a mold, imaging a mold-side alignment mark recorded in the mold and a film-side alignment mark recorded in the film by a camera, positioning the film with respect to the mold by moving the film so that the film-side alignment mark comes close to the mold-side alignment mark, injecting resin into the mold in a mold closed state in which the film is sandwiched between the first mold and the second mold and cooling the resin to form a molded article and opening the mold and taking out the molded article in which the decorative pattern of the film is transferred to the surface.

5 Claims, 5 Drawing Sheets

(51) Int. Cl.
    *B44C 1/16*       (2006.01)
    *B29C 45/14*      (2006.01)
    *B29C 45/76*      (2006.01)
    *B29C 33/12*      (2006.01)
    *B29C 33/14*      (2006.01)

(52) U.S. Cl.
    CPC ...... *B29C 45/14065* (2013.01); *B29C 45/372* (2013.01); *B29C 45/76* (2013.01); *B44C 1/16* (2013.01); *B29C 45/14016* (2013.01); *B29C 2045/14172* (2013.01); *B29C 2945/76083* (2013.01); *B29C 2945/76264* (2013.01); *B29C 2945/76294* (2013.01); *B29C 2945/76357* (2013.01); *B29C 2945/76464* (2013.01); *B29C 2945/76568* (2013.01); *B29C 2945/76742* (2013.01); *B29C 2945/76772* (2013.01)

(56) References Cited

FOREIGN PATENT DOCUMENTS

| | | |
|---|---|---|
| JP | 5-154869 | 6/1993 |
| JP | 3621961 B | 2/2005 |
| JP | 2007-210126 | 8/2007 |
| JP | 2013-184300 | 9/2013 |
| JP | 2014-60237 | 4/2014 |

\* cited by examiner

CAMERA VIEW

METHOD AND APPARATUS FOR DECORATIVE MOLDING

TECHNICAL FIELD

The technical field relates to a method and an apparatus for decorative molding that transfer a decorative pattern to the surface of a molded article in injection molding at the same time as the molding.

BACKGROUND

A method for decorative molding in which a decorative pattern is transferred to the surface of a molded article formed of resin by injecting a molten resin into a mold for molding to decorate the surface at the same time as the resin molding is known. In this method, the mold is closed and the molten resin is injected between a first mold and a second mold forming a cavity of the mold for molding in a state where a film on which the decorative pattern is printed is sandwiched and the resin is cooled, then, a molded article is taken out by opening the first mold and the second mold, thereby transferring a portion of the decorative pattern on the film to the surface of the molded article. As the film, a belt-like film is used.

In Japanese Patent No. 3621961 (Patent Literature 1), a technique of correcting positional displacement of the film by driving the position of the belt-like body with respect to the mold for molding in a longitudinal direction and a width direction is disclosed.

The method for decorative molding and the technique of Patent Literature 1 will be explained with reference to FIG. 7.

Here, a first mold 21 forming the cavity of the mold for molding is shown by a solid line and a second mold 22 is shown by a virtual line. A roll-shaped film wound body 4 is installed in an unwinding part 1. A film 7 in the film wound body 4 is pushed to a feeding motor shaft 6 by a pinch roller 5 and drawn out from the film wound body 4 by driving of the feeding motor shaft 6. The film 7 passes between the first mold 21 and the second mold 22 in the mold-open state and is stretched in a winding part 3. In the winding part 3, the film 7 is pushed onto the surface of a pull-in motor shaft 9 by a winding pinch roller 10. The film 7 passing the pull-in motor shaft 9 is connected to a used film wound body 11.

The first mold 21 and the second mold 22 are closed and the molten resin is injected and cooled, thereby transferring the decorative pattern of the film 7 to the surface of the molded article. A used section of the film 7 from which a portion of the decorative pattern is removed is wound by the used film wound body 11 by opening the first mold 21 and the second mold 22 and driving the feeding motor shaft 6 and the pull-in motor shaft 9. At the same time, an unused section of the film 7 is supplied from the film wound body 4 between the first mold 21 and the second mold 22.

Generally, a decorative film and a functional film are already printed or transferred/laminated on the film 7 in the film wound body 4, and the film 7 in the state in which tension is acted is installed so that flat surfaces on mold parting surfaces of the first mold 21 and the second mold 22 are parallel to the film 7.

Next, an already-printed film-side alignment mark 15 is set to have enough illuminance to be detected by a camera 13 when being lit up by a lighting device 14, and further, a position of the film-side alignment mark 15 reflected on a mirror unit 12 is detected by the camera 13. Positioning is performed by moving the film 7 in the longitudinal direction and the width direction so that the film-side alignment mark 15 the position of which is detected by the camera 13 comes close to a setting mark previously set inside a camera view.

Next, the film 7 is fixed to the first mold 21 by suction or/and fixed by a clamp jig 8.

Next, the second mold 22 is moved to be closed with the first mold, then, the molten resin is injected to form a molded article. At this time, a decorative film on the film 7 is transferred to the molded article. After cooling, the molded article is taken out. The film 7 in the used section is wound by the used film wound body 11 after the molding.

SUMMARY

However, in the method for decorative molding shown in FIG. 7, the positioning is performed by imaging the film-side alignment mark 15 on the film 7 by the camera 13 and by moving the film in the longitudinal direction and the width direction. Accordingly, it is necessary to check positioning alignment every time the mold is replaced, to measure a displacement amount of a decorative pattern in the finished molded article and to change setting of the positioning part, therefore, it takes time for preparation until starting production.

Particularly in a case of a molded article with a deep-drawing shape, the molten resin is injected after the film 7 is closely attached to the mold parting surface while being stretched by suction, thereby allowing the film 7 to follow the metal shape. Accordingly, the film 7 is stretched from upper, lower, right and left directions exceeding an elastic limit, therefore before molding, even when the print mark on the film is positioned to a prescribed position, the decorative pattern is displaced from a target position after molding. Therefore, in the case where the molded article with the deep-drawing shape is formed by decorative molding, it is necessary to check positioning alignment of the mounted mold every time the mold is replaced, to measure a displacement amount of the decorative pattern in the finished molded article and to change setting of the positioning part, therefore, it takes further long time for preparation until starting production.

The present disclosure has been made in order to solve the above problems and an object thereof is to provide a method for decorative molding capable of reducing a preparation time at the time of replacing the mold as compared with related art and expecting improvement of positioning accuracy of the decorative pattern in the molded article.

A method for decorative molding according to the present disclosure includes the steps of supplying a film on which a decorative pattern is formed between a first mold and a second mold in a mold open state of a mold including the first mold and the second mold, imaging a mold-side alignment mark recorded in the mold and a film-side alignment mark recorded in the film by a camera, positioning the film with respect to the mold by moving the film so that the film-side alignment mark comes close to the mold-side alignment mark, injecting resin into the mold in a mold closed state in which the film is sandwiched between the first mold and the second mold and cooling the resin to form a molded article and opening the mold and taking out the molded article in which the decorative pattern of the film is transferred to the surface.

According to the above structure, the film is positioned by moving the film in the longitudinal direction and the width direction so that the film-side alignment mark comes close to the mold-side alignment mark by using the mold-side alignment mark as a reference, then, resin is injected into the mold in the metal closed state and the resin is cooled to thereby form the molded article, therefore, the preparation time at the time of replacing the mold can be reduced as compared with a case where the film is positioned by detecting only the film-side alignment mark by the camera.

DESCRIPTION OF EMBODIMENTS

A method for decorative molding according to embodiments of the present disclosure will be explained.

Embodiment 1

Figure 1:
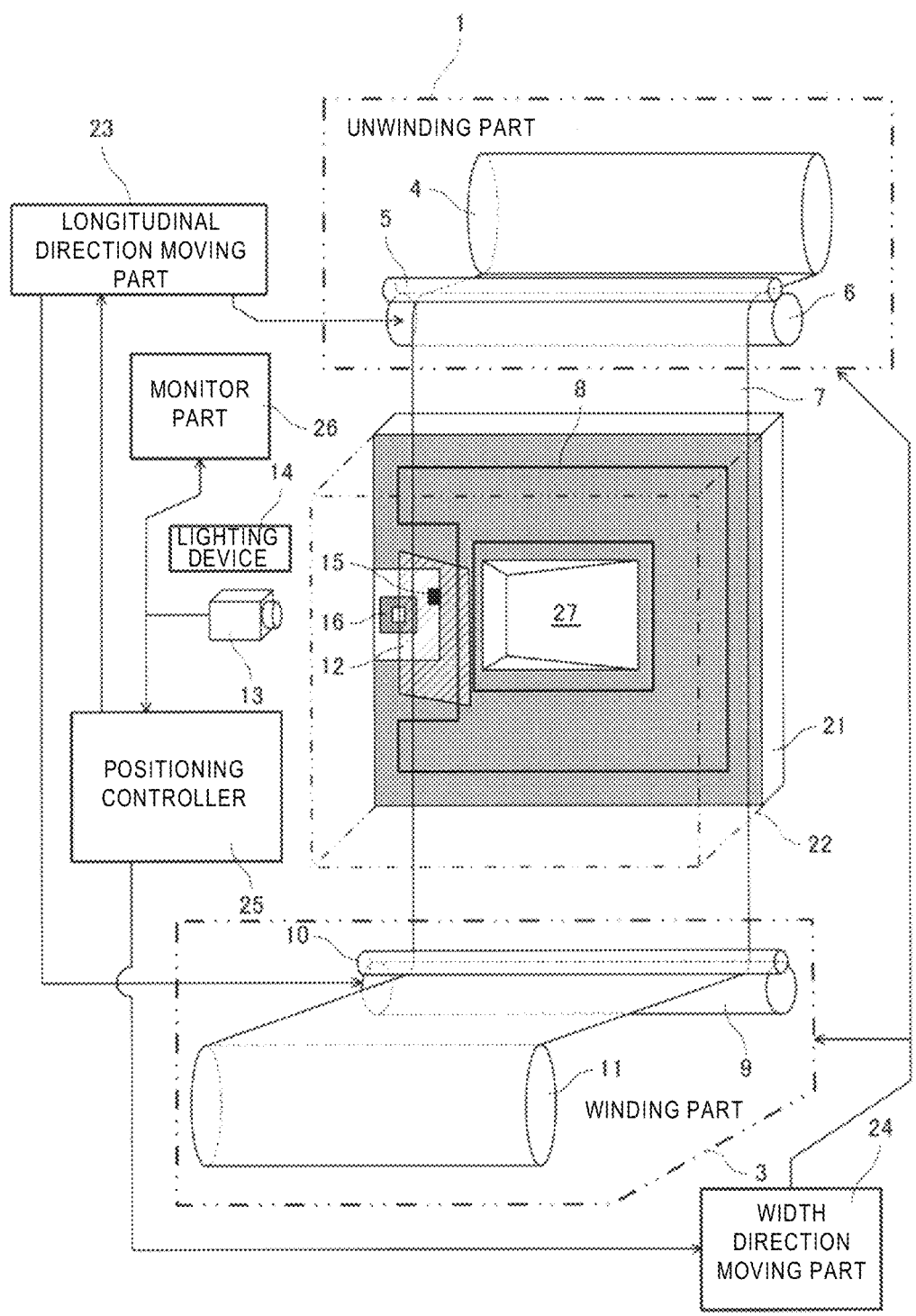
FIG. 1 is a structure view of an apparatus for decorative molding that realizes a method for decorative molding according to the present disclosure.
Figure 2:
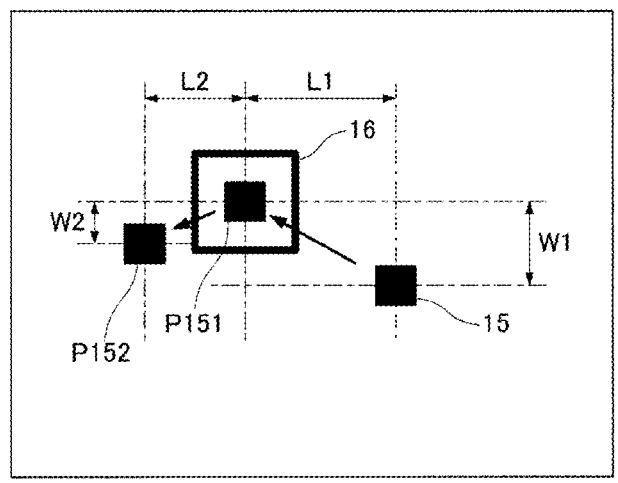
FIG. 2 is an explanatory view of operation in Embodiment 1.

FIG. 1 and FIG. 2 show an apparatus for decorative molding that realizes the method for decorative molding according to the present disclosure.

In FIG. 1, a first mold 21 forming a cavity of a mold for molding is shown by a solid line and a second mold 22 is shown by a virtual line.

The belt-like film 7 supplied between the first mold 21 and the second mold 22 in the mold open state passes between the first mold 21 and the second mold 22 from an unwinding part 1 and stretched in a winding part 3. Distances of the first mold 21, the film 7 and a mold parting surface of the first mold 21 at the time of supplying the film 7 are clearances of approximately 1 to 5 mm so that the film 7 does not contact the mold, but the clearances are not limited to such values.

A roll-shaped film wound body 4 is installed in the unwinding part 1. The film 7 in the film wound body 4 is pushed to a feeding motor shaft 6 by a pinch roller 5, and is drawn out from the film wound body 4 by driving of the feeding motor shaft 6. The feeding motor shaft 6 can determine an amount of rotation and can determine a feeding amount of the film 7.

In the winding part 3, the film 7 is pushed onto the surface of a pull-in motor shaft 9 by a winding pinch roller 10. The film 7 passing the pull-in motor shaft 9 is wound by a used film wound body 11. The pull-in motor shaft 9 can determine the rotation amount and can determine the feeding amount of the film 7. The pull-in motor shaft 9 measures a tension by a tension measurement device (not shown) and adjusts the film 7 to a designated tension for maintaining or restoring the shape and size of a decorative pattern without wrinkling the film 7.

The unwinding part 1 and the winding part 3 are provided with a width direction moving part 24 moving the unwinding part 1 and the winding part 3 in the width direction of the film 7 in addition to a longitudinal direction moving part 23 intermittently moving the film 7 in the longitudinal direction by driving the feeding motor shaft 6 and the pull-in motor shaft 9 in a mold open state.

A decorative film and a functional film are already printed or transferred/laminated on the film 7 in the film wound body 4, and the film 7 is stretched in the state in which the tension is acted is installed so that flat surfaces on metal parting surfaces of the first mold 21 and the second mold 22 are parallel to the film 7.

On the film 7, film-side alignment marks 15 are already formed repeatedly at fixed intervals in the longitudinal direction of the film 7 by printing or laminating.

A mold-side alignment mark 16 is recorded on the parting surface of, for example, the first mold 21 from among the first mold 21 and the second mold 22. The mold-side alignment mark 16 is formed by printing or engraving directly on the first mold 21.

As other components, a mirror unit 12, a camera 13, a lighting device 14, a positioning controller 25 controlling the longitudinal direction moving part 23 and the width direction moving part 24 based on imaged results of the camera 13, a monitor part 26 displaying taken images by the camera 13 and the like are provided. The mirror unit 12 is provided for detecting the film-side alignment mark 15 and the mold-side alignment mark 16 at the same time by the camera 13 provided on the outside of the mold.

Structures of the positioning controller 25, the longitudinal direction moving part 23 and the width direction moving part 24 will be specifically explained with molding processes.

The longitudinal direction moving part 23 drives the feeding motor shaft 6 and the pull-in motor shaft 9 in the mold open state so that an unused section of the film 7 is supplied to a suitable position of a recessed part 27 formed on the parting surface of the first mold 21. The recessed part 27 has a depth of 1 mm or more from the parting surface of the first mold 21.

Then, when the movement of the film 7 in the longitudinal direction necessary for molding of one time is ended, the illuminance is set by lighting up the film 7 by the lighting device 14 so as to be detected by the camera 13, and further, the positioning controller 25 calculates a width-direction positional displacement amount W1 necessary for the film-side alignment mark 15, the position of which is detected by the camera 13, to come close to the mold-side alignment mark 16 captured in the same camera view and a longitudinal-direction positional displacement amount L1 necessary for the film-side alignment mark 15 to come close to a position P151 of the mold-side alignment mark 16 as shown in FIG. 2 based on image data by the camera 13 that records the mold-side alignment mark 16 and the film-side alignment mark 15 reflected on the mirror unit 12 imaged by the camera 13 at the same time.

Then, the positioning controller 25 corrects the obtained positional displacement amount W1 and the positional displacement amount L1 by later-described correction amounts W2 and L2, instructing the width direction moving part 24 and the longitudinal direction moving part 23 to correct the position of the film 7. That is, the positioning controller 25 instructs the width direction moving part 24 to move the film 7 in the width direction to the left side by W1–W2 again. The positioning controller 25 also instructs the longitudinal direction moving part 23 to move the film 7 in the longitudinal direction to the reverse direction of the moving direction by L1+L2 again. The film-side alignment mark 15 is positioned in a position P152 shown in FIG. 2 on the image of the camera 13 after the second movement by the width direction moving part 24 and the longitudinal direction moving part 23.

After the positional correction of the film 7 is completed, the film 7 is pushed onto the parting surface of the first mold 21 by a clamp jig 8 and the film 7 is sucked to an inner surface of the recessed part 27 by vacuum suction from the recessed part 27 and fixed therein.

Next, the second mold 22 is moved to be closed with the first mold 21, then, the molten resin is injected to the mold to thereby form a molded article. At this time, the decorative pattern such as the decorative film on the film 7 is transferred to the molded article at the same time. Then, after the cooling, the mold is opened and the molded article is taken out. The film 7 in the used section after the molding is wound by the used film wound body 11. At the same time, an unused section of the film 7 is supplied from the film wound body 4 between the first mold 21 and the second mold 22.

In a case where the molded article to be molded is not a deep-drawing article, the positioning controller 25 calculates W1 and L1 so that the film-side alignment mark 15 in the image of the camera 13 is positioned in the position P151 based on positions of the mold-side alignment mark 16 and the film-side alignment mark 15 in the image data imaged by the camera 13 at the same time, and automatically corrects the position of the film 7 following an installation position of a replaced mold, therefore, the decorative pattern can be transferred to a suitable position of the molded article and a manual work in which the positional displacement amount of the decorative pattern transferred to the molded article is actually measured by a worker and positions of the film 7 in the longitudinal direction and the width direction are corrected as in related art can be eliminated, therefore, a preparation time at the time of replacing the mold can be reduced as compared with related art.

In a case where the molded article to be molded is a deep-drawing article, the film 7 is sucked to the inner surface of the recessed surface 27 by vacuum suction from the recessed part 27, therefore, the film 7 is stretched from upper, lower, right and left directions exceeding an elastic limit, therefore, even when the film-side alignment mark 15 is positioned in the position P151 before molding, the decorative pattern is displaced from a target position after molding. Therefore, in the case where decorative molding is performed to the molded article with the deep-drawing shape, it is difficult to add the decorative pattern to the suitable position of the molded article. Accordingly, in the case where the molded article to be molded is the deep-drawing article, the film-side alignment mark 15 is moved again by W1−W2 in the width direction and by L1+L2 in the longitudinal direction, not to the position P151 before molding. When a dimension of W2 and a dimension of L2 are set in accordance with a shape and a dimension of deep drawing in the recessed part 27 as well as properties of the film 7 to be used, a manual work in which the positional displacement amount of the decorative pattern transferred to the molded article is actually measured by a worker and positions of the film 7 in the longitudinal direction and the width direction are corrected as in related art can be eliminated, therefore, the preparation time at the time of replacing the mold in the case where the molded article is the deep drawing article can be reduced as compared with related art.

Furthermore, at the time of replacing the mold due to model switching and the like, relative positions of the film-side alignment mark 15 and the mold-side alignment mark 16 can be adjusted by watching an image of a prescribed distance between the film-side alignment mark 15 and the mold-side alignment mark 16 at the previous production imaged by one camera 13 on the monitor part 26, therefore, time for positioning between the film and the mold can be largely reduced.

As described above, alignment positions between the molded article and the decorative pattern can be determined by each mold by performing positioning of the film 7 in which the film-side alignment marks 15 are recorded based on the mold-side alignment mark 16, therefore, the molded article in which the decorative pattern is positioned with high accuracy can be easily fabricated even when the mold is replaced due to model switching and the like.

The film-side alignment mark 15 is preferably a colored light-shielding mark with a color suppressing reflection of external light to thereby form a contrast to a background for making detection by the camera 13 easier.

The mold-side alignment mark 16 is preferably larger than the film-side alignment mark 15 and has a different shape from the film-side alignment mark 15 for being discriminating, and is also a light-shielding mark with a color suppressing reflection of external light. The light-shielding property does not mean that the mark does not transmit light at all.

Furthermore, when the film-side alignment mark 15 and the mold-side alignment mark 16 have different colors, difference in shape can be easily discriminated. In FIG. 2, the film-side alignment mark 15 has a square shape and the mold-side alignment mark 16 has a hollow square shape, however, the shapes are not limited to such as long as discrimination can be made by changing the shape and size.

In the case where the molded article to be molded is the deep-drawing article, serious plastic deformation occurs in the film 7 after molding, therefore, it is possible to provide a mechanism for focusing individually when the film-side alignment mark 15 and the mold-side alignment mark 16 are not within a depth of focus of the camera 13 by widening the clearance between the film 7 and the molding surface of the first mold 21.

Although the structure in which the alignment marks are detected inside the mold is adopted in the present embodiment, it is possible to separately provide the mold-side alignment mark 16 on the outside of the mold such as above or below the mold to make detection.

When the mold-side alignment mark 16 is provided below the mold, the alignment mark 16 is provided at a bracket of a structure protruding from the mold and is seen by one camera 13 together with the alignment mark 15.

Embodiment 2

Figure 3:
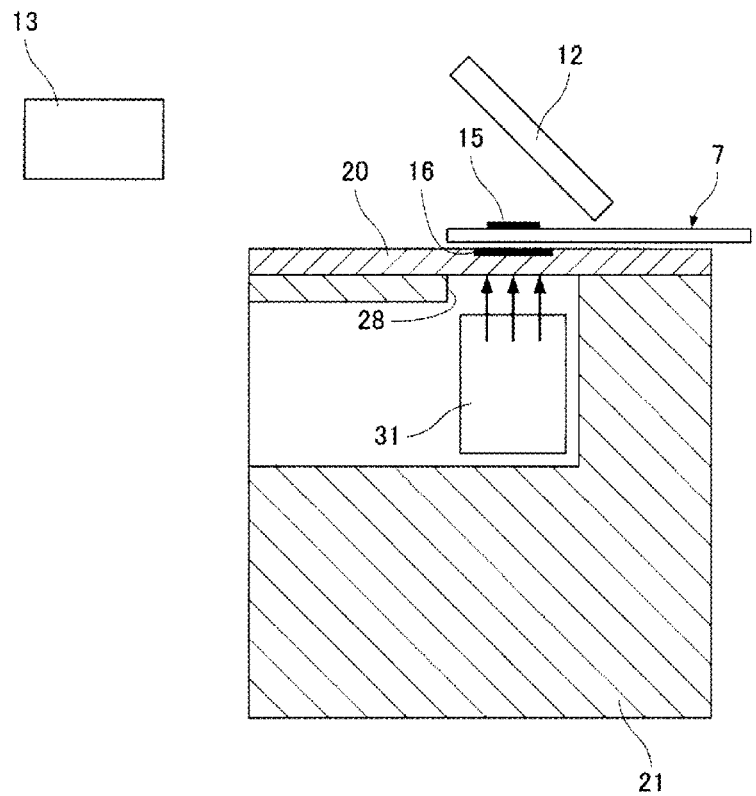
FIG. 3 is a cross-sectional view of a relevant part of the apparatus for decorative molding according to Embodiment 2.
Figure 4:
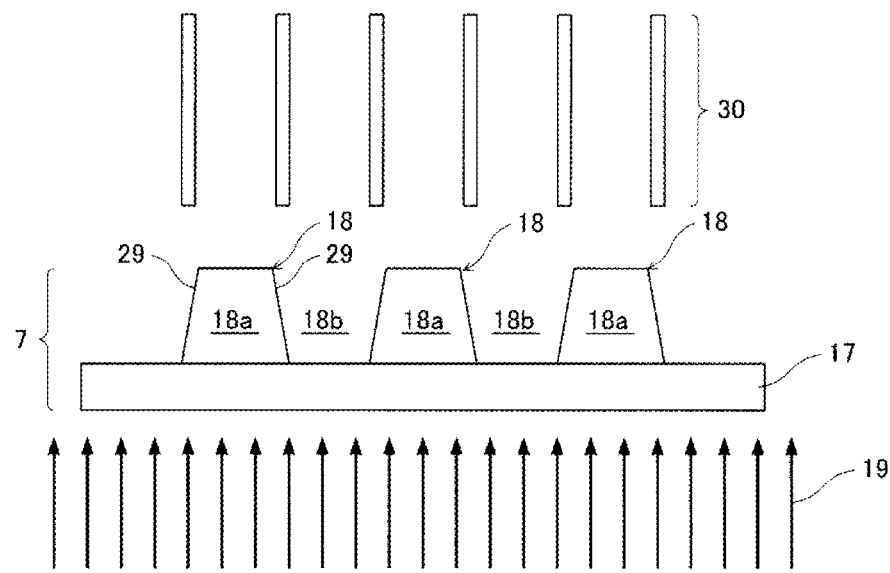
FIG. 4 is an enlarged cross-sectional view of a film showing a shape of alignment marks according to Embodiment 2.
Figure 5:
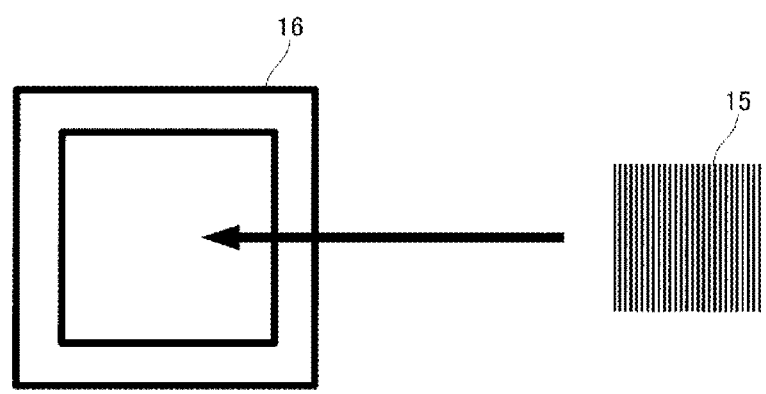
FIG. 5 is an enlarged plan view showing a mold-side alignment mark and a film-side alignment mark according to Embodiment 2.

FIG. 3 to FIG. 5 show Embodiment 2.

FIG. 3 just shows structures of the mold-side alignment mark 16 and the film-side alignment mark 15 and the periphery of the camera 13 imaging these marks at the same time, and other structures are the same as those of Embodiment 1.

A lighting device 31 used for imaging by the camera 13 is arranged inside the first mold 21. A parallel light 19 radiated from the lighting device 31 is emitted from holes 28 opening at the parting surface of the first mold 21. The mold-side alignment mark 16 is drawn on a transparent plate 20 such as glass arranged on the parting surface of the first mold 21. The mold-side alignment mark 16 is colored with a transparent color by a method of printing, graving or deposition, which does not matter.

The film-side alignment mark 15 provided on the film 7 is transparent or has a transparent color. There is a case where a light transmission film is printed or laminated on the film 7 for improving functions such as an antireflective film or an anti-fingerprint film as a decorative pattern.

The transparent color has a colored light transmitting property such as stained glass or frosted glass. It is difficult to be recognized by the camera 13 in a case of the transparent color, edge parts can be detected by applying parallel light through transmission. When the film-side alignment mark 15 transmits or does not transmit only light with a particular wavelength, it is possible to discriminate the mark.

In the case where the film-side alignment mark 15 which is colored and has the light shielding property is adopted as in Embodiment 1, it is necessary to print or laminate the mark in a separate process from the process of the decorative pattern, therefore, a cost of the film 7 is necessary. Accordingly, the structure shown in FIG. 4 is adopted in Embodiment 2, and the film-side alignment marks 15 formed of a light transmission film 18 that is a transparent or transparent colored film are formed on the film 7. That is, the light transmission film 18 for improving functions is printed or laminated on a base material film 17 as a base of the film 7. The light transmission film 18 is preferably provided in lines or in lattice shape, in which convex portions 18a and concave portions 18b preferably have 0.5 mm or less in width.

When the parallel light 19 is radiated to the film 7 from the base material film 17 side, the parallel light 19 diffuses on edge parts 29 of the light transmission film 18 and is not capable of travelling straight, therefore, shadows represented as projected images 30 are made when seen by the camera 13 from the light transmission film 18 side to allow the camera 13 to recognize shapes of the projected images 30 as the film-side alignment marks 15.

As the mold-side alignment mark 16 is colored with the transparent color and the film-side alignment mark 15 is the light transmission film, the mold-side alignment mark 16 is easily detected even when the mold-side alignment mark 16 overlaps the film-side alignment mark 15, which prevents detection error of the alignment mark and improves positioning accuracy.

The film-side alignment mark is expressed by the black square in FIG. 2. In an example of FIG. 5, the mark has a stripe shape as shown in FIG. 4 as well as a shape such as a square. This transparent mark is positioned in the center of the mold-side alignment mark in the same manner as FIG. 2.

According to Embodiment 2, decorative molding can be performed to the molded article by using the film 7 having the film-side alignment marks 15.

Embodiment 3

Figure 6:
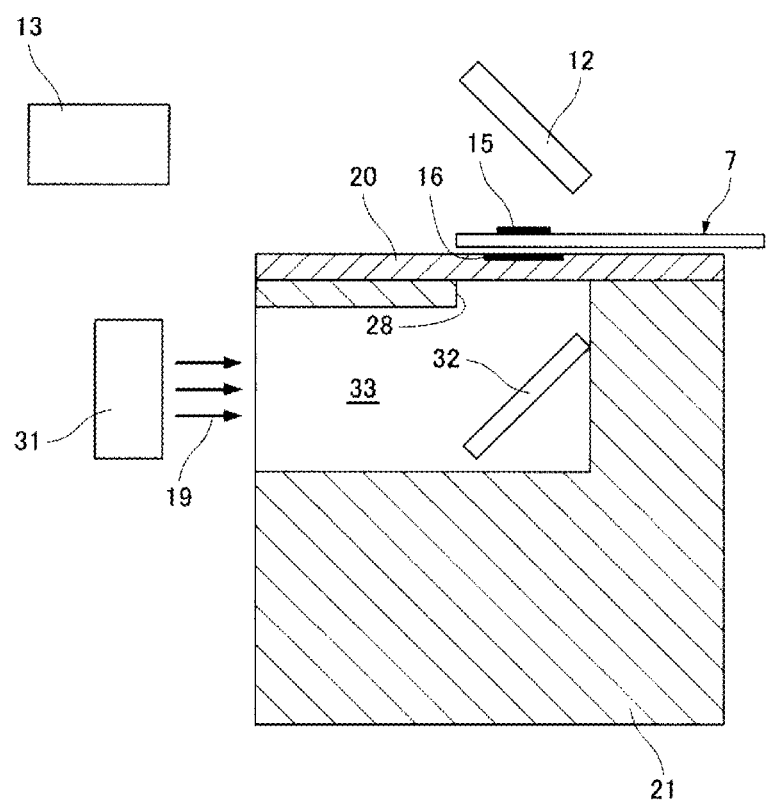
FIG. 6 is a cross-sectional view of a relevant part of an apparatus for decorative molding according to Embodiment 3.
Figure 7:
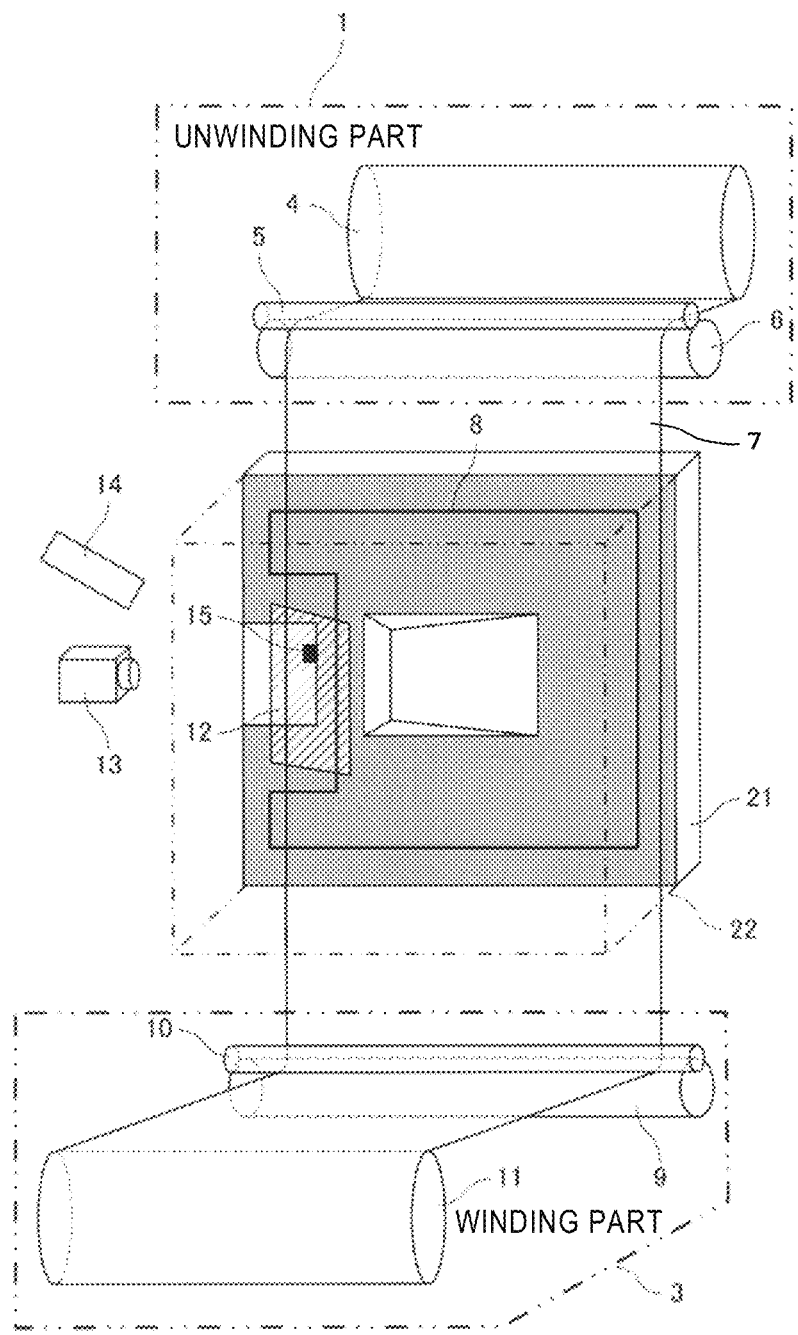
FIG. 7 is a structure view of an apparatus for decorative molding in related art.

FIG. 6 shows Embodiment 3.

The lighting device 31 is arranged inside the first mold 21 in Embodiment 2. In FIG. 6, the lighting device 31 is arranged on the outside of the first mold 21. The parallel light 19 from the lighting device 31 is incident from a path 33 formed in the first mold 21 and is radiated to the mold-side alignment mark 16 by changing an irradiation direction of the parallel light 19 by the mirror unit 32. The parallel light 19 reaches the camera 13 through a transparent plate 20, the film 7 and the mirror unit 12.

Generally, molding is performed while the temperature of the mold is controlled at the time of injection molding using resin, therefore, the lighting device 31 may exceed an allowable temperature range, for example, 55° C. in the case where the lighting device 31 is arranged inside the mold as in Embodiment 2. Accordingly, the lighting device 31 is arranged on the outside of the mold in Embodiment 3, and the mirror unit 32 inside the mold is hardly affected by the temperature of the mold by using a specular material such as glass.

The mold-side alignment mark 16 is colored with the transparent color, however, the mold-side alignment mark 16 may be formed of a transparent light-transmission film when adopting an arrangement in which the film-side alignment mark 15 does not overlap the mold-side alignment mark 16.

The present disclosure may be applied to applications of injection molding with various types of decorative patterns.

What is claimed is:

1. A method for molding comprising:
supplying a film on which a pattern is formed between a first mold and a second mold of a mold in a mold open state;
arranging a mold-side alignment mark colored with a transparent color on a transparent plate in the mold;
irradiating the mold-side alignment mark and a film-side alignment mark recorded in the film with parallel light from a side of the mold and imaging the marks by a camera;
positioning the film with respect to the mold by moving the film so that the film-side alignment mark comes close to the mold-side alignment mark, injecting resin into the mold in a mold closed state in which the film is sandwiched between the first mold and the second mold and cooling the resin to form a molded article; and
opening the mold and taking out the molded article in which the pattern of the film is transferred to a surface of the molded article.

2. The method for molding according to claim 1, wherein the mold-side alignment mark and the film-side alignment mark have colors different from each other.

3. The method for molding according to claim 2, wherein the film-side alignment mark has a transparent color.

4. The method for molding according to claim 1, wherein the film-side alignment mark is formed to be transparent or formed with a transparent color and the mold-side alignment mark and the film-side alignment mark are detected by the camera to perform positioning.

5. The method for molding according to claim 1, wherein the film-side alignment mark is a transparent light-transmission film, and
light diffused at edge parts of the light transmission film is detected by the camera to perform positioning.

* * * * *